United States Patent
Mor et al.

(10) Patent No.: US 11,042,572 B2
(45) Date of Patent: *Jun. 22, 2021

(54) SYSTEM AND METHOD FOR SPATIAL CLUSTERING USING MULTIPLE-RESOLUTION GRIDS

(71) Applicant: Verint Systems Ltd., Herzliya Pituach (IL)

(72) Inventors: Gilad Mor, Elad (IL); Ronen Nussbaum, Petah Tikva (IL)

(73) Assignee: VERINT SYSTEMS LTD., Pituach (IL)

(*) Notice: Subject to any disclaimer, the term of this patent is extended or adjusted under 35 U.S.C. 154(b) by 232 days.

This patent is subject to a terminal disclaimer.

(21) Appl. No.: 16/175,968

(22) Filed: Oct. 31, 2018

(65) Prior Publication Data

US 2019/0065530 A1 Feb. 28, 2019

Related U.S. Application Data

(63) Continuation of application No. 15/142,780, filed on Apr. 29, 2016, now Pat. No. 10,146,794.

(30) Foreign Application Priority Data

Apr. 30, 2015 (IL) .......................................... 238562

(51) Int. Cl.
*G06F 16/29* (2019.01)
*G06F 16/35* (2019.01)

(52) U.S. Cl.
CPC .............. *G06F 16/29* (2019.01); *G06F 16/35* (2019.01)

(58) Field of Classification Search
CPC ........ G06F 16/29; G06F 16/285; G06F 16/35; G06F 16/353; G06F 16/355; G06F 16/95
(Continued)

(56) References Cited

U.S. PATENT DOCUMENTS 8,364,515 B1 * 1/2013 Procopiuc ............. H04W 16/18
                                                                  705/7.29
9,454,554 B1 * 9/2016 St-Pierre ............. G06F 3/04815
(Continued)

OTHER PUBLICATIONS

Josef Dabernig, "Geocluster: Server-Side clustering for mapping in Drupal based on Geohas" published in 2013, pp. 1-104, download: http://dasjo.at/files/geocluster-thesis-dabernig.pdf.*
(Continued)

*Primary Examiner* — Hares Jami
(74) *Attorney, Agent, or Firm* — Isus Intellectual Property PLL; Anthony Jason Mirabito (57) ABSTRACT

Methods and systems for clustering objects using Geohash grids. The clusters are typically displayed on an interactive map. A clustering module receives multiple objects having respective geo-information and derives clusters for the objects in respective grid cells of a given resolution level. The clustering is based on the geo-information of the objects at one or more resolution levels that are finer than the given resolution level. Clustering based on finer-resolution levels provides spatial information at a granularity that is unavailable at the given resolution level and therefore achieves clustering with improved accuracy. The geo-information may comprise a Geohash spatial index that specifies the geographic location in accordance with the Geohash system.

20 Claims, 6 Drawing Sheets

(58) Field of Classification Search
USPC .................................................. 707/737–740
See application file for complete search history.

(56) References Cited

U.S. PATENT DOCUMENTS

| | | |
|---|---|---|
| 2013/0326538 A1 | 12/2013 | Gupta et al. |
| 2014/0109002 A1 | 4/2014 | Kimball et al. |
| 2014/0143251 A1* | 5/2014 | Wang .................... G06F 16/285 707/737 |
| 2014/0212066 A1* | 7/2014 | Brasnett .................... G06T 5/50 382/284 |
| 2015/0017616 A1* | 1/2015 | Rachitsky ............... H04W 4/21 434/130 |
| 2015/0199380 A1* | 7/2015 | Avramova .......... G06F 16/9537 707/738 |

OTHER PUBLICATIONS

Yguel et al., "3D mapping of outdoor environment using clustering technique" published in 2011, IEEE, pp. 1-6. download: http://ieeexplore.ieee.org/abstract/document/6103356/.*

Dabernig, J., "Geocluster: Server-side clustering for mapping in Drupal based on Geohash," Thesis, 2013, 114 pages.

Yguel, M. et al., "3D mapping of outdoor environment using clustering technique," 2011 IEEE 23$^{rd}$ International Conference on Tools with Artificial Intelligence, http://ieeexplore.ieee.org/abstract/document/6103356, 2011, 6 pages.

* cited by examiner

SYSTEM AND METHOD FOR SPATIAL CLUSTERING USING MULTIPLE-RESOLUTION GRIDS

CROSS-REFERENCE TO RELATED APPLICATIONS

This application is a continuation of U.S. patent application Ser. No. 15/142,780, filed on Apr. 29, 2016, entitled "SYSTEM AND METHOD FOR SPATIAL CLUSTERING USING MULTIPLE-RESOLUTION GRIDS," the contents of which are hereby incorporated by reference in their entirety.

FIELD OF THE DISCLOSURE

The present disclosure relates generally to data clustering, and particularly to methods and systems for visualizing spatially clustered data.

BACKGROUND OF THE DISCLOSURE

Visualization systems that handle large amounts of data typically cluster the data for display. Methods for location-based clustering are known in the art. For example, in a Thesis entitled "Geocluster: Server-side clustering for mapping in Drupal based on Geohash," Jun. 2, 2013, which is incorporated herein by reference, Dabernig describes a server-side clustering solution for mapping in Drupal based on Geohash. Some search engines support location-based searching. For example, Elasticsearch is an open source product offered by Elasticsearch (Los Altos, Calif.) that implements a real-time search and analytics engine and supports geo-location-based queries.

SUMMARY OF THE DISCLOSURE

An embodiment that is described herein provides a method for spatial clustering, including receiving multiple objects having respective geo-information that encodes a geographic location of each object using multiple grids of multiple respective resolution levels. Clusters of the objects are derived in respective grid cells of a grid of a given resolution level, based on the geo-information of the objects at one or more resolution levels that are finer than the given resolution level. The derived clusters are presented on a map.

In some embodiments, the geo-information of a given object includes a string that is constructed such that prefixes of different lengths of the string give the geographic location of the given object at respective different resolution levels. In other embodiments, deriving the clusters includes calculating for one or more grid cells of the given resolution level a respective cluster center based on a spatial distribution of the objects in one or more of the grid cells of the finer resolution levels. In yet other embodiments, calculating the cluster center includes averaging center coordinates of the one or more grid cells of the finer resolution levels.

In an embodiment, averaging the center coordinates includes assigning respective weights to the center coordinates and calculating a weighted average of the center coordinates using the assigned weights. In another embodiment, assigning the weights includes assigning weight values that are related to respective numbers of objects in the cells of the finer resolution levels. In yet another embodiment, deriving the clusters includes merging first and second clusters into a single cluster when the respective cluster centers of the first and second clusters are closer than a given threshold with respect to a given distance metric.

In some embodiments, deriving the clusters includes creating a cluster at a border of neighboring cells of the given resolution level, when a number of the objects at the finer resolution levels that are in a vicinity of the border exceeds a threshold number. In other embodiments, deriving the clusters includes calculating for one or more grid cells of the given resolution level a respective cluster size based on a spatial distribution of the objects in one or more of the grid cells of the finer resolution levels. In yet other embodiments, receiving the objects includes receiving the objects in a selected geographic region of the map, and deriving the clusters includes deriving the clusters only in respective grid cells overlapping the selected region.

There is also provided, in accordance with an embodiment that is described herein, an apparatus that includes a processor and an interface. The processor is configured to receive multiple objects having respective geo-information that encodes a location of each object using multiple grids of multiple resolution levels, to derive clusters for the objects in respective grid cells of the grids of a given resolution based on the geo-information of the objects at one or more resolution levels that are finer than the given resolution level. The interface is configured to send the derived clusters for display on a map.

The present disclosure will be more fully understood from the following detailed description of the embodiments thereof, taken together with the drawings in which:

DETAILED DESCRIPTION OF EMBODIMENTS

Overview

Visualizing a large number of data elements on a map may be performed by grouping the elements into a relatively small number of clusters, which are then displayed. In some applications it is sufficient to use approximated locations to a desired precision. For example, the Geohash system encodes latitude/longitude information using a hierarchy of multiple grids of different resolution levels. Using the Geohash system, the location of a given point is typically approximated to the center coordinates of the grid cell to which the point belongs. Thus, finer-resolution grid cells may approximate the actual location more accurately than coarser-resolution grid cells. In the description that follows, the terms Geohash cells and grid cells are used interchangeably. Geohash cells and grid cells are also referred to herein simply as cells, for brevity.

Embodiments that are described herein provide improved methods and systems for clustering objects using Geohash grids. The clusters are typically displayed on an interactive map. In the disclosed techniques, a clustering module receives multiple objects having respective geo-information and derives clusters for the objects in respective grid cells of a given resolution level. The clustering is based on the geo-information of the objects at one or more resolution levels that are finer than the given resolution level. Clustering based on finer-resolution levels provides spatial information at a granularity that is unavailable at the given resolution level and therefore achieves clustering with improved accuracy. In some embodiments, the geo-information comprises a Geohash spatial index that specifies the geographic location in accordance with the Geohash system.

A cluster is typically specified by at least its position and size. Various methods can be used for determining the cluster center position. In one approach, the cluster center is determined by averaging the latitude/longitude coordinates of the cluster objects. This, however, is infeasible, when the number of objects is very large (e.g., on the order of millions) or in applications that require real-time response such as interactive maps. In another approach, the cluster center comprises the latitude/longitude center coordinates of the respective cell. Such clustering may result, however, in display artifacts on an interactive map, when the user dynamically reselects the area for display, the display zoom or both.

The clustering module can derive the cluster center position in various ways. In one embodiment, the clustering module calculates the cluster center based on the spatial distribution of the objects in one or more grid cells of the finer resolution levels. In some embodiments, the clustering module averages the center coordinates of one or more grid cells of the finer resolution levels using any suitable averaging method.

In some embodiments, the clustering module assigns respective weights to the finer resolution cells, and derives the cluster center by calculating a weighted average of the respective center coordinates using the assigned weights. For example, the clustering module can assign weight values that are proportional to the number of objects in the cells of the finer resolution levels.

In some embodiments, the clustering module checks the distance among the centers of the derived clusters with respect to some distance metric (e.g., Euclidian distance), and merges clusters whose centers are closer than a predefined threshold distance into a single cluster.

In some situations, a large number of objects reside near the border of neighboring cells of the given resolution level and should therefore be assigned a separate cluster, rather than being split among the individual neighbor cells. In some embodiments, the clustering module creates a cluster at or near the border of neighboring cells of the given resolution, when the total number of objects at the finer resolution levels that are in close vicinity to the border exceeds a threshold number.

Using the disclosed techniques, a large number of objects can be clustered and displayed on an interactive map, with none or only minimal display artifacts. The disclosed techniques can be combined with location-based search engines.

System Description

Figure 1:
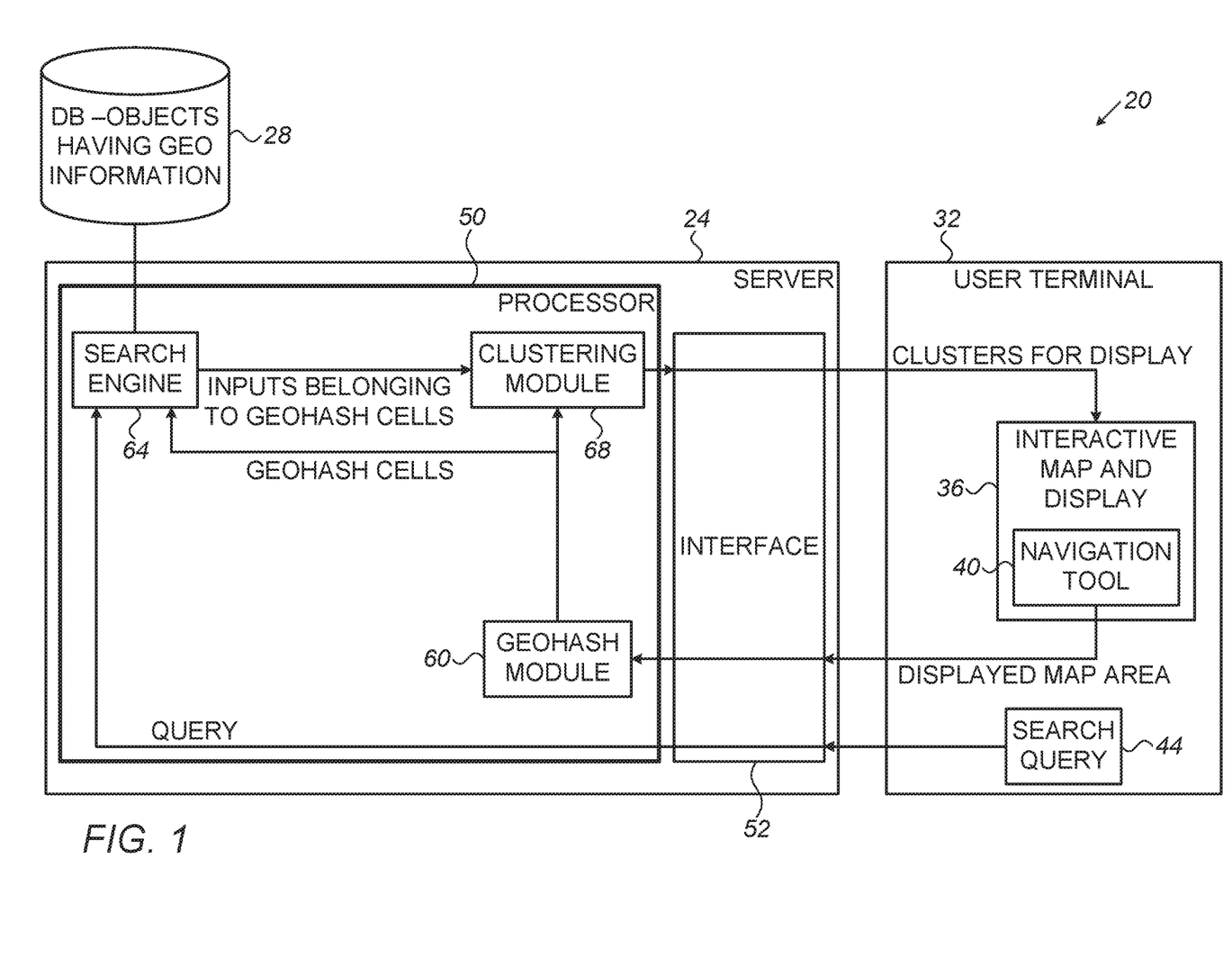
FIG. 1 is a block diagram that schematically illustrates a system for displaying clustered objects on a map, in accordance with an embodiment that is described herein.

FIG. 1 is a block diagram that schematically illustrates a system for displaying clustered objects on a map, in accordance with an embodiment that is described herein. System 20 comprises a server 24, which is coupled to a Data Base (DB) 28. DB 28 stores multiple objects that each is associated or tagged with geographic location information. The objects may comprise, for example, text documents that were retrieved from various Web sites and/or social networks over the Internet. Alternatively, the objects may be generated by analyzing data captured in public or private networks, e.g., Electronic Mails (Email). Further alternatively, the objects may comprise intercepted phone calls. Yet further alternatively, the objects may comprise information of any suitable type and format.

The geographic location attributed to the objects in DB 28 typically comprises latitude/longitude coordinates. Alternatively or additionally, the geographic location of the objects in DB 28 comprises geocodes of the Geohash system. In some embodiments, the objects in DB 28 are indexed using the geographic location, which enables efficient retrieval of objects in a constrained geographic area. The objects in DB 28 are typically indexed with additional attributes for quick retrieval. For example, a query to the DB may retrieve all the phone calls that originate in some geographic region.

System 20 further comprises a user terminal 32 coupled to server 24. Terminal 32 comprises an interactive map 36 that displays a geographical map to a user. Interactive map 36 comprises a navigation tool 40 for selecting a desired region of interest on the map for display, e.g., by applying panning and zooming operations. Panning refers to changing the displayed area of the map without changing the scale. Zooming in (or out) refers to increasing (or decreasing) the display scale about a given panning center.

Terminal 32 further comprises a search query module 44 that enables the user to generate search queries that include search attributes other than location. For example, a given search query may retrieve from DB 28 only objects that relate to a specific social network.

Server 24 comprises a processor 50 and an interface 52. Interface 52 receives from interactive map 36 definitions of the selected map region for display (also referred to herein as displayed area), and delivers these definitions to processor 50. Processor 50 derives clusters for objects retrieved from DB 28 in the selected region, and sends the clusters for display on interactive map 36 via interface 52.

In some embodiments, the displayed area comprises a rectangular region on the map represented by respective latitude/longitude coordinates of the rectangle vertices. Alternatively, the rectangle can be represented by its center coordinates and the length of its edges. Further alternatively, any other suitable shape for the displayed area other than rectangle and can also be used.

Processor 50 comprises a Geohash module 60 that selects the current Geohash resolution level for clustering. Goehash module 60 outputs one or more Geohash geocodes that identify the cells (i.e., of the selected resolution level) to which processor 50 should cluster the objects. Geohash module 60 may use any suitable method for selecting the resolution level for clustering. For example, module 60 can select the resolution level, which determines the number of meters displayed per pixel, in relation to the length of the Geohash geocodes that determines the size (e.g., height by width square meters) of the Geohash cells.

In some embodiments Geohash module 60 may exclude from clustering one or more of the cells that cover the displayed area. For example, module 60 may exclude cells that are not entirely contained within the displayed area. As another example, module 60 may exclude cells in a predefined or configurable restricted region of the displayed area.

Processor 50 further comprises a search engine 64 that accepts search queries from search query module 44 and further accepts the cells for clustering from Geohash module 60. Search engine 64 uses the cells information and possibly the search query to retrieve selected objects from DB 28. For example, search engine can retrieve all the Emails captured in the displayed area.

A clustering module 68 receives the retrieved objects from search engine 64 and the cells for clustering from Geohash module 60. Clustering module 68 clusters the objects in the Geohash cells and delivers the clusters for display on interactive map 36 via interface 52. In the disclosed techniques, module 68 clusters the objects based on their spatial distribution in cells of finer resolution levels, as will be described in detail below.

In response to reselecting a different map area for display, processor 50 retrieves the objects from the DB in accordance with the updated display area, clusters the retrieved objects and sends the updated clusters for display on the map.

The system configuration in FIG. 1 is given by way of example, which is chosen purely for the sake of conceptual clarity. Alternatively, any other suitable system configuration can also be used. For example, although in FIG. 1, server 24 and user terminal 32 comprise separate modules, in alternative embodiments, terminal 32 in integrated within server 24.

Generally, the different elements of system 20 may be implemented using software, hardware or a combination of hardware and software elements. In some embodiments, processor 50 comprises a general-purpose processor, which is programmed in software to carry out the functions described herein. The software may be downloaded to the processor in optical or electronic form, over a network, for example, or it may, additionally or alternatively, be provided and/or stored on non-transitory tangible media, such as magnetic, optical, or electronic memory.

Although in the example of FIG. 1 Geohash module 60 and search engine 64 are executed by processor 50, in alternative embodiments Geohash module 60 and search engine 64 can be executed by one or more other processors within server 24. Further alternatively, Geohash module 60, search engine 64 or both comprise modules external to server 24, and communicate with processor 50 using suitable links and interfaces.

Geo-Location Encoding Using Geohash Grids

Figure 2:
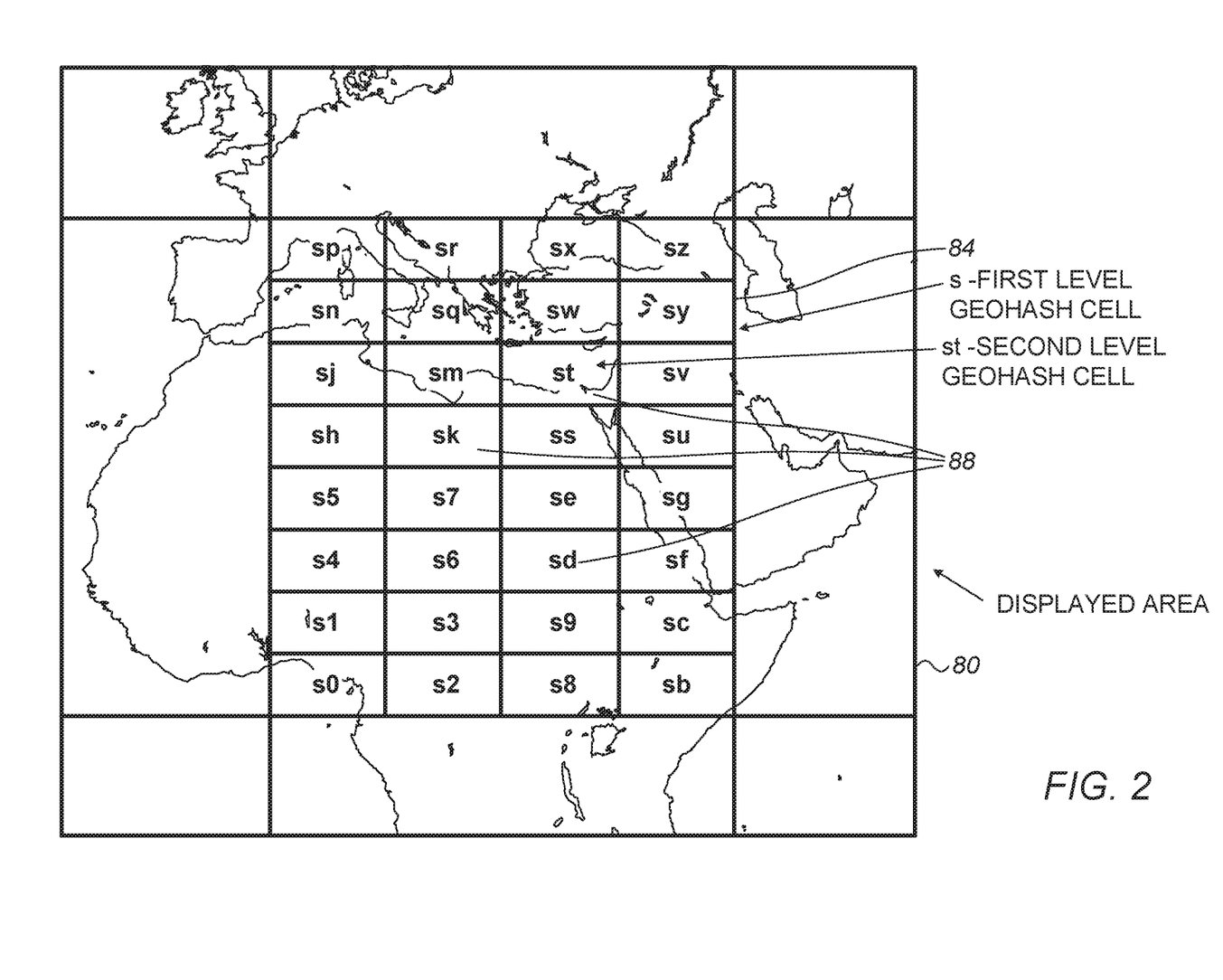
FIG. 2 is a diagram depicting Geohash cells of two resolution levels presented on a geographical map, in accordance with an embodiment that is described herein.

FIG. 2 is a diagram depicting Geohash cells of two resolution levels presented on a geographical map, in accordance with an embodiment that is described herein. The outer rectangle in the figure represents a displayed area 80 of the map, which includes a Geohash cell 84 of the first (coarsest) resolution level. Cell 84 is divided into cells 88 of the next finer resolution level. In accordance with the Geohash system, cell 84 comprises thirty two cells 88.

The Geohash system associates with the Geohash cells respective geocodes or spatial indices that comprise unique textual strings of one or more characters. The strings assigned to the cells of a given resolution level share the same prefix string and differ only by the rightmost character. The strings assigned to the cells of the coarsest level comprise a single character, and for each finer resolution level an additional character is appended.

In the example of FIG. 2 the string "s" comprises the spatial index of cell 84, and the spatial index of each cell 88 comprises a two-character string starting with "s". In the Geohash system, a spatial index corresponds to the latitude/longitude coordinates of the respective cell's center. For example, the spatial index "s7" corresponds to the coordinates N 20° 0.000', E 17° 0.000', in Africa.

In the Geohash system, a point on the map can belong to multiple grid cells of different resolution levels. The location of the point is represented by the Geohash system as the spatial index of a cell that contains the point and has the finest resolution level among all the cells that contain this point. For example, the coordinate pair N 18° 21.100', E 17° 54.100' is represented by the spatial index "s7k8rkgd5ndm".

In the description that follows, we use the terms "parent cell" and "child cell" to refer to cells of different resolution levels that are related mainly in two aspects: 1) a parent cell has a coarser resolution than its child cells, and 2) a child cell is contained within the boundaries of its parent cell.

In the context of the present disclosure and in the claims, a spatial index in accordance with the Geohash system comprises a string that is constructed such that prefixes of different lengths give different resolution levels, as depicted, for example, in Table 1 below.

Table 1 below depicts an example of Geohash cells of multiple consecutive resolution levels. In Table 1, the cell at some level is a child cell of the cell in the preceding level. For example, the cell indexed by "sx8" at level 3 is a child cell of the cell indexed by "sx" at level 2. The rightmost column in the table depicts the number of objects in the respective cells.

TABLE 1

A hierarchy of Geohash cells of consecutive resolution levels.

| Geohash resolution level | Spatial index | Number of objects in cell |
| --- | --- | --- |
| 1 | s | 504321 |
| 2 | sx | 45621 |
| 3 | Sx8 | 4251 |
| 4 | sx8d | 820 |
| 5 | sx8df | 156 |
| 6 | sx8dfs | 65 |
| 7 | sx8dfsy | 5 |
| 8 | sx8dfsyu | 2 |
| 9 | sx8dfsyur | 1 |
| 10 | sx8dfsyurb | 1 |

As noted above, the objects are clustered into the cells to which they belong. Consequently, in the Geohash system, the objects in a parent cell of a given resolution level are divided among one or more respective child cells of the next finer resolution level. Therefore, given a parent cell and its child cells of the next finer resolution level, the total number of the objects in the child cells equals the number of the objects in the respective parent cell.

The spatial indexing method of the Geohash system allows efficient retrieval of location-based data from a data base such as DB 28 of FIG. 1 above. Assume that the objects are stored in the DB along with the respective spatial indices. Thus, the objects in a given cell (i.e., including its child cells of all finer resolution levels) can be retrieved by finding objects in the DB whose spatial index string starts with the string of the spatial index of the given cell.

Methods for Geohash-Based Clustering

Figure 3:
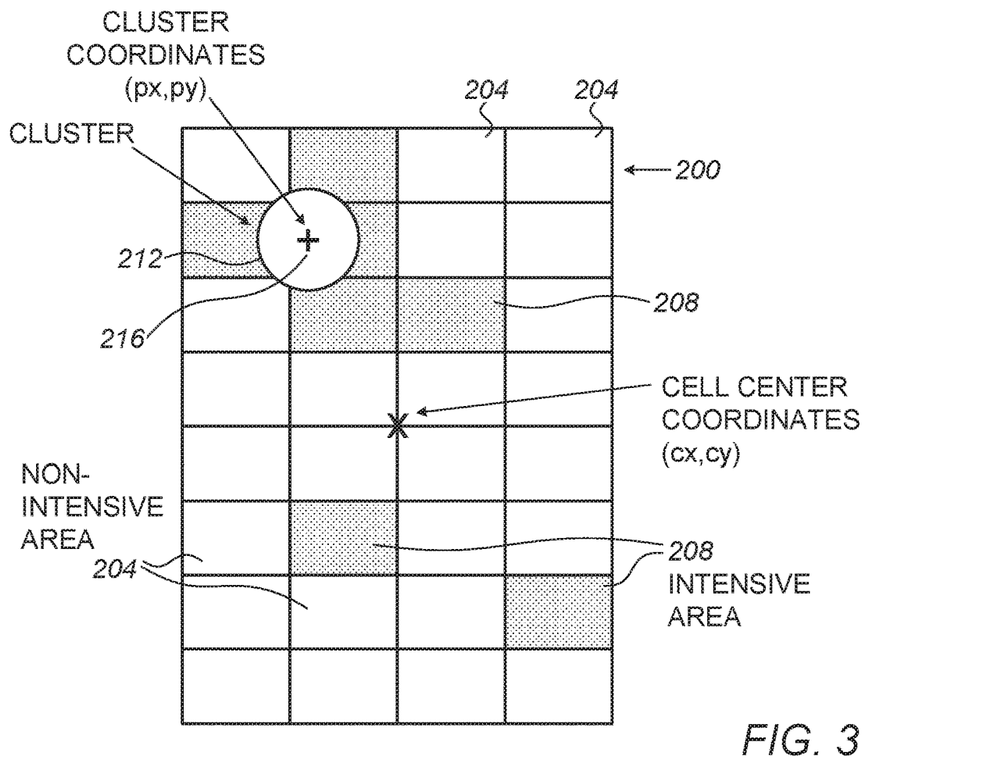
FIG. 3 is a diagram that schematically illustrates a cluster whose center depends on spatial distribution of objects in a finer resolution level, in accordance with an embodiment that is described herein.

FIG. 3 is a diagram that schematically illustrates a clustering method that is based on the spatial distribution of the objects in a finer resolution level, in accordance with an embodiment that is described herein. The method of FIG. 3 (as well of the methods described in FIGS. 4 and 5 below) can be executed, for example, by clustering module 68 of FIG. 1 above.

FIG. 3 depicts a Geohash cell 200 of a selected resolution level. Cell 200 comprises child cells 204 and 208 of the next finer resolution level. Cells 204 (white) and 208 (colored) respectively represent geographic areas of non-intensive and intensive activity. Thus, the number of objects in cells 208 is typically larger than in cells 204. In addition, in the present example the spatial distribution of the objects among the child cells is non-uniform, having dominant activity area around a cluster 212.

Since cells 204 and 208 of the finer resolution level provide spatial information of finer granularity, the clustering module can position the cluster of cell 200 much more accurately than it would have by using only the spatial information available at the resolution level of cell 200.

In FIG. 3, cluster 212 of cell 200 is depicted by a circle shape and a cluster center 216. Note that in this example, taking the center coordinates of cell 200 as the cluster center would be inconsistent with the actual non-uniform spatial distribution.

In an embodiment, the clustering module specifies the size of cluster 212 as proportional to the number of cluster objects. For example, the cluster size can be represented by the radius of circle 212. Alternatively, cluster 212 can have a geometrical shape of any other suitable type with multi-parameter size. For example, the size of an oval shaped cluster can comprise a two-dimensional size parameter corresponding to the two axes of the oval.

In the example of FIG. 3, deriving cluster position 216 is based on the spatial distribution of the objects in cells 204 and 208. In some embodiments, the clustering module derives cluster position 216 by averaging the center coordinates of child cells 204 and 208, for example, by applying a weighted average to the center coordinates of the child cells. In some embodiments, the weights used for averaging are related to the number of objects in cells 204 and 208.

In one embodiment, the clustering module assigns a weight for a child cell 204 or 208 proportionally to the respective number of objects in the child cells. In alternative embodiments, any other function of the number of cell objects can also be used. In accordance with the spatial distribution in the example of FIG. 3, cells 208 are weighted higher than cells 204 and therefore cluster position 216 is offset toward the dominant intensive area.

Figure 4:
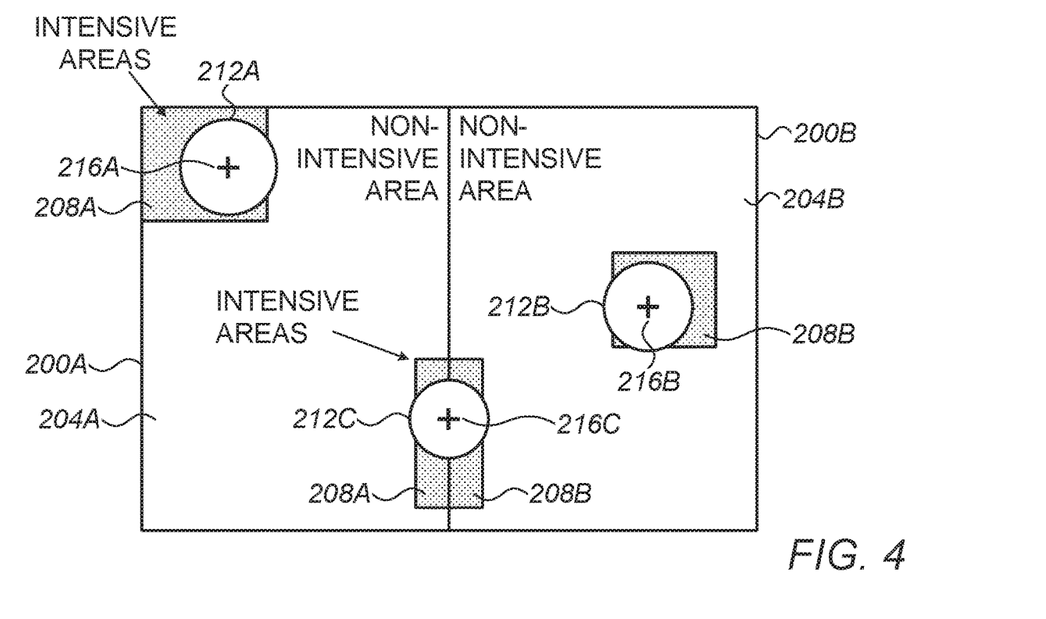
FIG. 4 is a diagram that schematically illustrates a method for creating a cluster at the border of neighbor cells, in accordance with an embodiment that is described herein.

FIG. 4 is a diagram that schematically illustrates a method for creating a cluster at the border of neighbor cells, in accordance with an embodiment that is described herein. FIG. 4 depicts two neighbor cells 200A and 200B. Similarly to FIG. 3 above, white areas 204A and 204B represent non-intensive areas of respective cells 200A and 200B, and, colored areas 208A and 208B represent areas of intensive activity in respective cells 200A and 200B. Note that some of the intensive activity occurs at adjacent areas 208A and 208B at the common border between cells 200A and 200B.

Assume that the clustering module first applies separate clustering in cells 200A and 200B using, for example, the method of FIG. 3 or any other suitable method. The separate clustering thus produces respective clusters 212A and 212B at respective cluster centers 216A and 216B.

In the present example, the activity at the border shared by cells 200A and 200B is significant and should be assigned a separate cluster. A cluster created at the border of neighbor cells is also referred to herein as a border cluster. The clustering module can use any suitable criterion for deciding whether or not to create a border cluster. In some embodiments, the clustering module identifies one or more adjacent child cells at the shared border having sufficiently large joint activity, and uses the identified child cells for creating a border cluster 212C. The clustering module calculates center position 216C of border cluster 212C, for example, by calculating a weighted average of the center coordinates of the identified child cells.

In some embodiments, following the creation of border cluster 212C, the clustering module updates positions 216A and 216B of clusters 212A and 212B and the cluster sizes, by excluding the child cells used to create border cluster 212C. In alternative embodiments, the clustering module identifies the child cells for creating border cell 212C and excludes these child cells from participating in creating clusters 216A and 216B.

Figure 5:
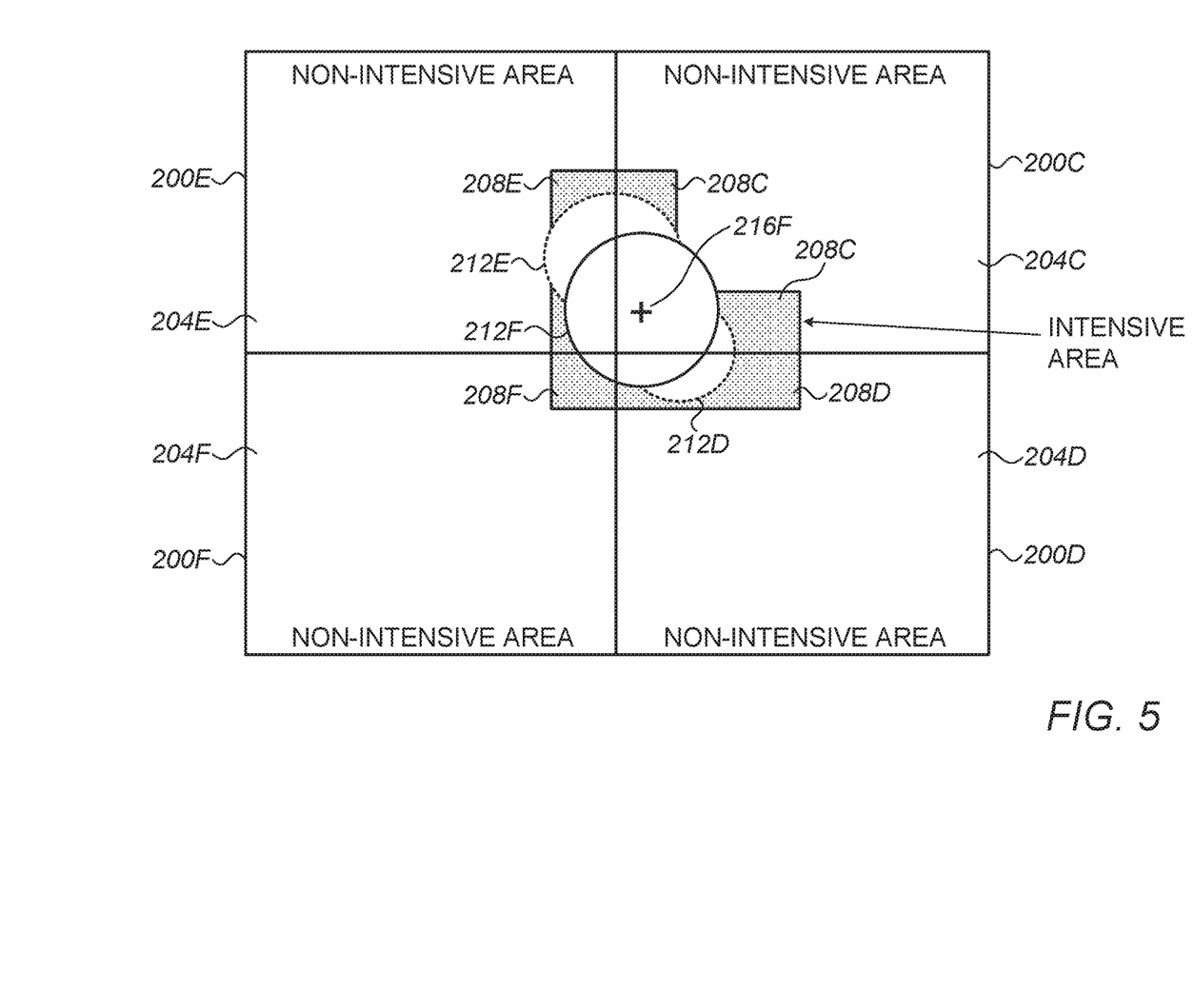
FIG. 5 is a diagram that schematically illustrates a method for merging clusters, in accordance with an embodiment that is described herein.

FIG. 5 is a diagram that schematically illustrates a method for merging clusters, in accordance with an embodiment that is described herein. FIG. 5 depicts four neighbor cells 200C, 200D, 200E and 200F. Areas 204C, 204D, 204E and 204F represent respective areas of weak activity, whereas areas 208C, 208D, 208E and 208F represent respective areas of intensive activity.

In the present example, applying the clustering method of FIG. 4 would first create two separate border clusters denoted 212D and 212E. In an embodiment, the clustering module applies a suitable criterion for deciding whether or not to merge clusters 212D and 212E into a merged cluster 212F. For example, the clustering module can decide to merge clusters 212D and 212E based on the distance between the respective cluster centers with respect to some distance metric. For example, the clustering module may decide to merge clusters 212D and 212E when the circles representing the clusters overlap. Other suitable distance metrics, such as, for example, an Euclidian distance, can also be used.

The clustering module may use any suitable method for merging clusters 212D and 212E into merged cluster 212F. In one embodiment, the clustering module calculates position 216F of cluster 212F by applying a weighted average to the centers of clusters 212D and 212E. In another embodiment, the clustering module calculates the weighted average of the center coordinates of the child cells that were used for creating both clusters 212D and 212E. In some embodiments, the size of cluster 212F equals the joint number of objects in clusters 212D and 212E.

Figure 6:
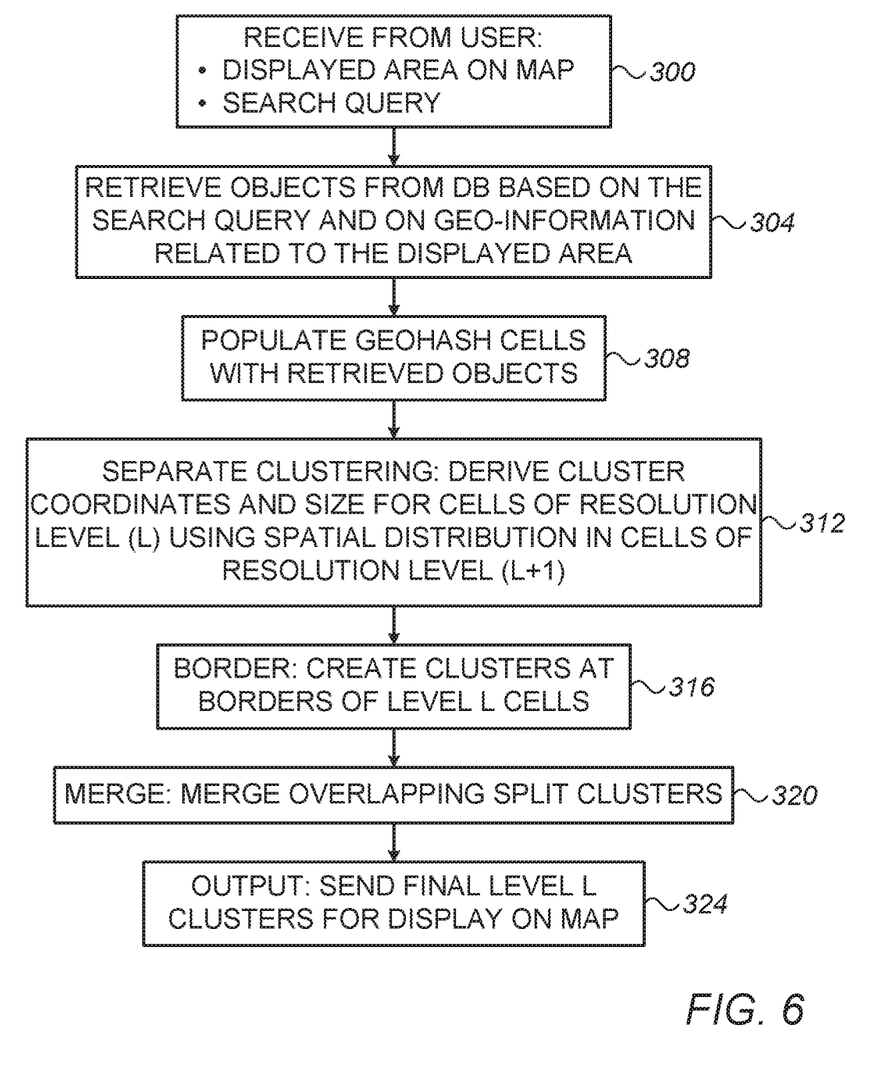
FIG. 6 is a flow chart that schematically illustrates a method for spatial clustering, in accordance with an embodiment that is described herein.

FIG. 6 is a flow chart that schematically illustrates a method for spatial clustering, in accordance with an embodiment that is described herein. The method can be executed, for example, by processor 50 of server 24 in FIG. 1 above. In describing the method we assume that DB 28 holds multiple objects with respective spatial indices. We further assume that a user selects a map area for display using interactive map 36, and generates a search query for DB 28 using search query module 44, as described above.

The method begins by processor 50 receiving from user terminal 32 definitions of the displayed area on map 36, and a search query from module 44, at an input step 300. In some embodiments, based on the displayed area, Geohash module 60 outputs the cells for which processor 50 should derive clusters.

At a retrieval step 304, search engine 64 retrieves objects from DB 28 based on the search query and the displayed area. For example, engine 64 may retrieve only objects that belong to cells as determined by Geohash module 60. In some embodiments, the objects are retrieved in cells of multiple resolution levels. At a population step 308, processor 50 allocates cells (e.g., using any suitable data structure) for the retrieved objects and populates the cells with the respective objects according to the cell position and resolution level.

At a separate clustering step 312, processor 50 derives a cluster per cell, for example, using the method of FIG. 3 above. In an example embodiment, the cluster position and size for a cell of resolution L is based on the spatial distribution of the objects in the respective child cells of the finer resolution level (L+1).

At a border clustering step 316, processor 50 creates border clusters using, for example, the method of FIG. 4 above. At a merging step 320, processor 50 merges mutually close clusters using, for example, the method of FIG. 5 above. Merging is typically applied to split clusters at a shared border of neighboring cells, but is applicable to other clusters as well. At an output step 324, processor 50 sends the final clusters to terminal 32 for display on interactive map 36.

Clustering Using Multiple Finer Resolution Levels

Figure 7:
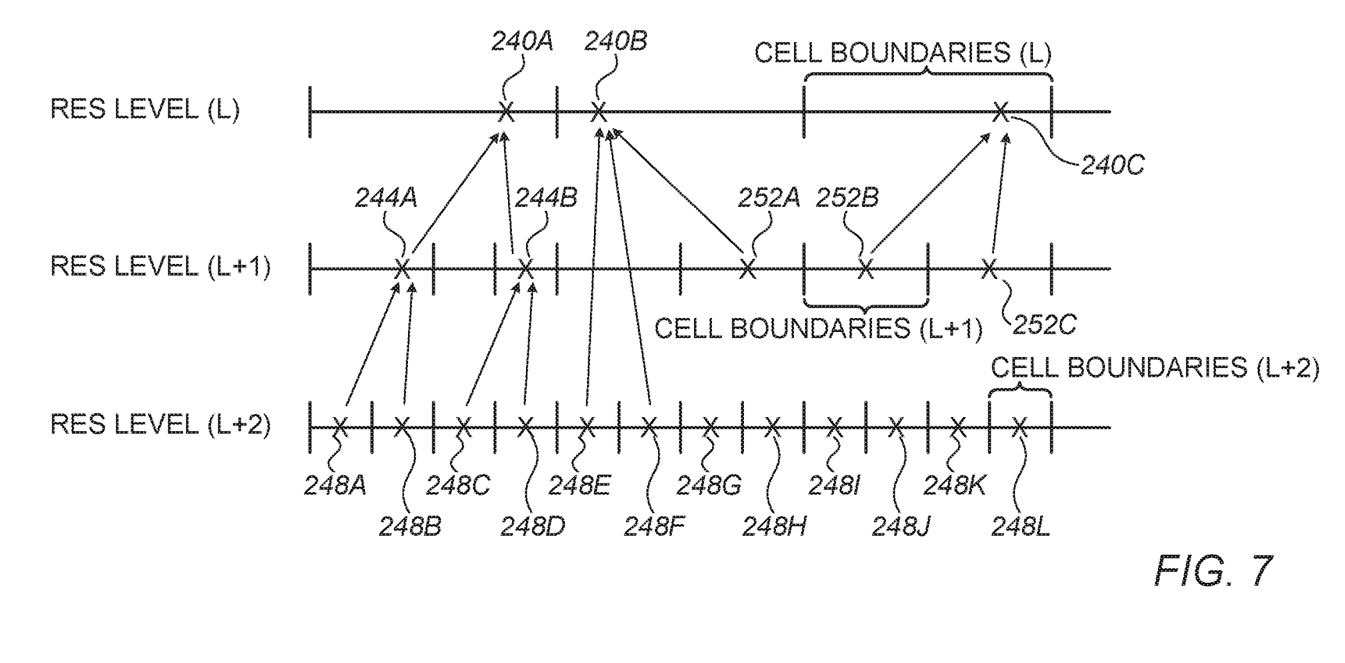
FIG. 7 is a diagram that schematically illustrates a method for spatial clustering using multiple grids of finer resolution, in accordance with an embodiment that is described herein.

FIG. 7 is a diagram that schematically illustrates a method for spatial clustering using multiple grids of finer resolution, in accordance with an embodiment that is described herein. The methods described in FIGS. 3-6 above mainly refer to deriving clusters in a given resolution level using the child cells on the next finer resolution level. The method of FIG. 7 extends this principle to using child cells of multiple different finer resolution levels. Several example such methods are described below.

FIG. 7 depicts grid cells in three consecutive resolution levels L, L+1 and L+2, wherein resolution level L+1 is finer than resolution level L, and resolution level L+2 is finer resolution than resolution level L+1. For the sake of visual clarity, the cells in FIG. 7 are depicted in one dimension, but the clustering methods disclosed below are applicable to grids of higher dimensions (e.g., 2D grids) as well.

FIG. 7 depicts three cells at resolution level L, six cells at level L+1 and twelve cells at level L+2. The cells at each level are child cells of respective cells at the preceding level. Cluster centers are depicted in the figure by the symbol X. The cluster center at one level is derived from certain points in the respective child cells. These points may comprise the child cell center coordinates, cluster center in the child cell or some other point as will be explained below.

In one embodiment, cluster center 240A is derived from cluster centers 244A and 244B of level L+1. The clusters of level L+1 are derived from cell center points 248A, 248B and 248C, 248D of level L+2. In another embodiment, cluster center 240B is derived from cell centers 248E and 248F of level L+2 and from cell center position 252A of level L+1. Similarly, cluster position 240C is derived from center cell positions 252B and 252C of level L+1.

In the examples described above, deriving a cluster center can be performed using, for example, weighted average of the center or cluster coordinates of the underlying child cells.

The methods described in FIGS. 3-7 above are given by way of example, and in alternative embodiments other suitable methods can also be used. For example, although in the methods above, creating and merging border clusters was mainly described as a post processing phase that following per cell clustering, this processing hierarchy is not mandatory. Alternatively, the child cells can be analyzed and the objects may be clustered in a single processing phase.

The methods described above refer mainly to the Geohash system. Alternatively, the disclosed techniques can be applied to other multi-resolution grid systems for geo-location and other applications. For example, the principles of the disclosed techniques may be applied to three-dimensional (3D) multi-resolution grids in a 3D space.

It will thus be appreciated that the embodiments described above are cited by way of example, and that the present disclosure is not limited to what has been particularly shown and described hereinabove. Rather, the scope of the present disclosure includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method for spatial clustering, comprising:
receiving multiple objects at a clustering module of a processor from a database using a search query accepted at a search engine of the processor, each object of the multiple objects having respective geo-information that encodes a geographic location of the each object using multiple geohash grids of multiple respective resolution levels, wherein the geo-information comprises a geohash spatial index that specifies the geographic location in accordance with a geohash system;
deriving a plurality of clusters of the multiple objects in respective grid cells of a geohash grid of a given resolution level, based on the geo-information of the multiple objects at at least one resolution level that is finer than the given resolution level;
merging at least two of the plurality of clusters into a single cluster;
determining a center position of the single cluster;
determining a center position of each of the remaining clusters of the plurality of clusters, wherein determining the center position of each of the remaining clusters of the plurality of clusters comprises excluding a center position of the grid cells of the plurality of clusters merged into the single cluster;
presenting the remaining clusters and the single cluster for display on an interactive map of a terminal, wherein the interactive map comprises a navigation tool;
selecting, by applying panning and zooming operations of the navigation tool, a region of interest on the interactive map; and
displaying the region of interest on the interactive map.

2. The method according to claim 1, wherein the geo-information of a given object comprises a string that is constructed such that prefixes of different lengths of the string give the geographic location of the given object at respective different resolution levels.

3. The method according to claim 1, wherein deriving the clusters comprises calculating for one or more grid cells of the given resolution level a respective cluster center based on a spatial distribution of the objects in one or more of the grid cells of the finer resolution levels.

4. The method according to claim 3, wherein calculating the cluster center comprises averaging center coordinates of the one or more grid cells of the finer resolution levels.

5. The method according to claim 4, wherein averaging the center coordinates comprises assigning respective weights to the center coordinates and calculating a weighted average of the center coordinates using the assigned weights.

6. The method according to claim 5, wherein assigning the weights comprises assigning weight values that are related to respective numbers of objects in the cells of the finer resolution levels.

7. The method according to claim 3, wherein deriving the clusters comprises merging first and second clusters into a single cluster when the respective cluster centers of the first and second clusters are closer than a given threshold with respect to a given distance metric.

8. The method according to claim 1, wherein deriving the clusters comprises creating a cluster at a border of neighboring cells of the given resolution level, when a number of the objects at the finer resolution levels that are in a vicinity of the border exceeds a threshold number.

9. The method according to claim 1, wherein deriving the clusters comprises calculating for one or more grid cells of the given resolution level a respective cluster size based on a spatial distribution of the objects in one or more of the grid cells of the finer resolution levels.

10. The method according to claim 1, wherein receiving the objects comprises receiving the objects in a selected geographic region of the map, and wherein deriving the clusters comprises deriving the clusters only in respective grid cells overlapping the selected region.

11. An apparatus comprising:
a processor, which is configured to:
receive multiple objects at a clustering module from a database based on a search query accepted at a search engine of the processor and a user-selected area on an interactive map of a terminal, wherein the interactive map comprises a navigation tool, each object of the multiple objects having respective geo-information that encodes a location of the each object using multiple geohash grids of multiple resolution levels, wherein the geo-information comprises a geohash spatial index that specifies the geographic location in accordance with a geohash system;
derive a plurality of clusters for the multiple objects in respective grid cells of the geohash grids of a given resolution level based on the geo-information of the multiple objects at at least one resolution level that is finer than the given resolution level;
merge at least two of the plurality of clusters into a single cluster;
determine a center position of the single cluster; and
determine a center position of each of the remaining clusters of the plurality of clusters, wherein determining the center position of each of the remaining clusters of the plurality of clusters comprises excluding a center position of the grid cells of the plurality of clusters merged into the single cluster; and
an interface, which is configured to send the remaining clusters and the single cluster for display on the interactive map,
wherein the processor is further configured to select, by applying panning and zooming operations of the navigation tool, a region of interest on the interactive map, and display the region of interest on the interactive map.

12. The apparatus according to claim 11, wherein the geo-information of a given object comprises a string that is constructed such that prefixes of different lengths of the string give the geographic location of the given object at respective different resolution levels.

13. The apparatus according to claim 11, wherein the processor is configured to calculate for one or more grid cells of the given resolution level a respective cluster center based on a spatial distribution of the objects in one or more of the grid cells of the finer resolution levels.

14. The apparatus according to claim 13, wherein the processor is configured to calculate the cluster center by averaging center coordinates of the one or more grid cells of the finer resolution levels.

15. The apparatus according to claim 14, wherein the processor is configured to average the center coordinates by assigning respective weights to the center coordinates and calculating a weighted average of the center coordinates using the assigned weights.

16. The apparatus according to claim 15, wherein the processor is configured to assign weight values that are related to respective numbers of objects in the cells of the finer resolution levels.

17. The apparatus according to claim 13, wherein the processor is configured to merge first and second clusters into a single cluster when the respective cluster centers of the first and second clusters are closer than a given threshold with respect to a given distance metric.

18. The apparatus according to claim 11, wherein the processor is configured to create a cluster at a border of neighboring cells of the given resolution level, when a number of the objects at the finer resolution levels that are in a vicinity of the border exceeds a threshold number.

19. The apparatus according to claim 11, wherein the processor is configured to calculate for one or more grid cells of the given resolution level a respective cluster size based on a spatial distribution of the objects in one or more of the grid cells of the finer resolution levels.

20. The apparatus according to claim 11, wherein the processor is configured to receive the objects in a selected geographic region of the map, and to derive the clusters only in respective grid cells overlapping the selected region.

* * * * *